E. STIEREN.
APPARATUS FOR OBTAINING BROMINE AND OTHER PRODUCTS FROM THE MOTHER WATER OF SALINES.
No. 3,480. Reissued June 1, 1869.
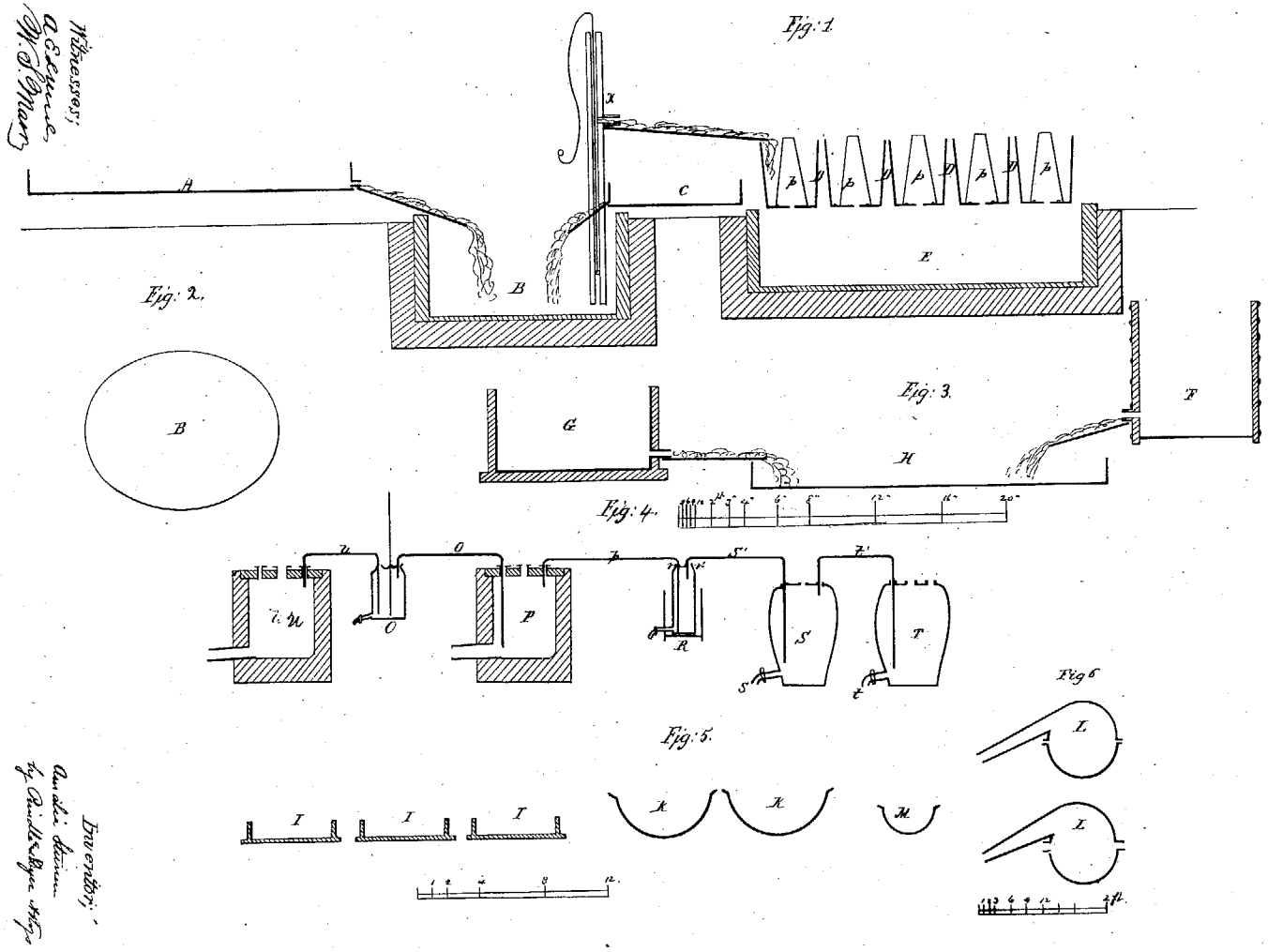

UNITED STATES PATENT OFFICE.

AMALIE STIEREN, OF NATRONA, PENNSYLVANIA, ASSIGNEE, BY MESNE ASSIGNMENTS, OF EDWARD STIEREN, DECEASED.

IMPROVED APPARATUS FOR OBTAINING BROMINE AND OTHER PRODUCTS FROM THE MOTH -WATER OF SALINES.

Specification forming part of Letters Patent No. 12,077, dated December 12, 1854; extended seven years; Reissue No. 3,480, dated June 1, 1869.

DIVISION B.

*To all whom it may concern:*

Be it known that EDWARD STIEREN, deceased, late of Allegheny county, in the State of Pennsylvania, did, on the 12th day of December, 1854, obtain of and from the United States of America certain Letters Patent for and upon "improvements in process for treating the mother-water of the salines," which Letters Patent were duly extended on the 12th day of December, 1868, for a further period of seven years from that date, and which said Letters Patent have been found to be defective in that certain mistakes were made in the specification and certain ambiguities exist in the claim thereof, by reason of which said specification and claim do not cover and embrace all of the original invention and improvements: Now, therefore, I, AMALIE STIEREN, widow of the aforesaid EDWARD STIEREN, and assignee of the entire interest in the aforesaid Letters Patent, being desirous to reissue the said Letters Patent, herewith surrendered, in two divisions, as stated in the accompanying petition, have prepared specifications and drawings of the said original invention and improvements, and do hereby declare that the following is a full, clear, exact, and more complete description of the apparatus employed in the treatment of the mother-water of the salines, which treatment or process is fully set forth in first division of this reissue, bearing even date herewith, reference being had to the accompanying drawings, and to the letters of reference marked thereon.

In the annexed drawings, A represents a sheet-iron pan, for boiling the bitter water, twenty feet long, from eight to ten feet wide, and eighteen inches deep. The vaporated lye is to be drawn out, by means of a wooden spout, into an oval-shaped basin, B, ten feet wide, twelve feet long, and six feet deep, sunk in the ground. This basin has a bottom of bricks eighteen inches thick, placed upon a foundation of worked clay, while its sides are formed of nine-inch bricks, laid lengthwise, and built in with the usual kind of lime-and-sand mortar, and backed up upon the outside by a filling of worked clay eighteen inches thick.

C represents a wooden box, eight feet long, four feet wide, and eighteen inches deep, in which lime must be placed and slaked with water. As much of this lime-cream must now be introduced into the basin B as may be requisite for the decomposition of the chloride of magnesium contained in the bitter water, of 36° Baumé. The slush now produced, which contains hydrate of magnesia, and chloride, bromide, and iodide of calcium, is to be drawn out by a wooden pump, X, on the edulcorating or filtering apparatus. This apparatus D D, &c., consists of a series of tubs three and one-half feet in diameter and four feet deep, having secured within each to the bottom thereof a wooden pyramid, *p*, nine inches in diameter at its upper and two feet in diameter at its lower end, and which projects three inches above the top of said tub. On the four sides of the pyramids, at suitable distances apart, there are a number of half-inch holes. These pyramids are wrapped with loose woven linens, so as to form a filter through which the lye in which the hydrate of magnesia is suspended may escape, leaving said hydrate of magnesia within the tubs. Each of these tubs are provided at their bottoms with a tap, capable of being opened and shut, and stand on or over a basin, E, which, like the basin A, is sunk in the ground, and is used for containing the lye filtered from the hydrate of magnesia. This basin is twenty feet long, six and one-half feet wide, and four and one-half feet deep in the clear, and like aforesaid basin A, has its bottom formed of bricks resting upon eighteen inches of worked clay, while its sides are formed of either brick or plank backed up with eighteen inches of worked clay. The stronger lyes are to be pumped into the vat F and used for making refined table-salt and for separating bromine and iodine.

After edulcorating the hydrate of magnesia, so that it contains no more adherent particles of lime salts, it is to be put into a wooden box, G, lined with lead, and neutralized by the addition of dilute sulphuric acid, and after this liquid, now a solution of sulphate of magnesia or Epsom salts, is settled, the clear lye is to be drawn off into the sheet-iron pan H, twenty-two feet long, twelve feet wide, and twenty inches deep, and boiled down to a strength of 33° Baumé, when the concentrated liquor is to be put into the crystallizing-vessels I I I, made of wood and tightened with a mixture of glue and lime dust. The pan H also is to be used for boiling down the liquid which remains after the decomposition of the lye by sulphate of soda in vat F, now a solution of chloride, bromide, and iodide of sodium.

K K represents large kettles of cast-iron used sometimes for purifying the (remainder) colored Epsom-salts lye, or if not for this purpose for making pure and refined table-salt. Each of these kettles is six feet in diameter and about thirty-one and one-half inches deep in the center.

L represents a cast-iron retort used for extracting iodine by the decomposition of the iodide of copper with manganese. This retort is to be cast in two parts, each of which is provided with a flange two inches wide, through which eight bolts are passed, and by means of which the said parts are firmly secured together. The upper half of each retort is lined with lead. The longest inside diameter of the retorts is twelve inches and the length of the neck fifteen inches.

M represents a small cast-iron kettle, to be used for boiling the remaining liquor from the iodide of copper, for the purpose of preparing the same for the separation of bromine. This kettle is three feet in diameter and eighteen inches deep in the center.

In Fig. 4 is shown the apparatus for separating bromine.

N and P represent two four-sided vessels, worked out of fine sand-stone, granite, or porphyry. Said vessels are three feet wide and three and one half feet high outside, and two feet wide and thirty-three inches deep inside. The vessel N has a closely-fitting cover, worked out of the same material as the vessels, and in said cover are three tubes, the middle four inches and the others two inches in diameter each. They are cut out of the same piece as the cover, and may be closed by stoppers of burnt clay. Close to the bottom there is a round hole, slightly slanting, about five inches in diameter, into which a cast-iron pipe three inches inside diameter and fifteen inches long may be inserted. This pipe is protected inside by a lining of lead one fourth of an inch thick, and is cemented inside and outside by lead poured in a melted state into the stone vessel, so that the liquid contained in said vessel may not come in direct contact with the iron pipe. The outer end of said pipe may be closed by a wooden stopper.

In the cover of vessel P there are also three tubes the middle one of which is three inches in diameter, and capable of being at times closed with a stopper of burnt clay. The second is two inches in diameter, and serves to receive a leaden pipe, while the third is one and one-fourth inch in diameter, and is intended for the reception of a glass pipe. A short distance from the bottom of the vessel P is attached a cast-iron pipe lined with lead, as in the vessel N. There are also on one of the four sides of each vessel N and P, and about twenty-four inches from the bottom, a hole one and one-half inch in diameter through which enters a cast-iron pipe, and passes in a spiral manner through the vessel and out on the opposite side to suffer the condensed steam to escape. Said pipes must be covered with lead the whole of their length inside of the vessels N and P, and being connected with a boiler, both vessels are supplied with the steam required.

The vessel O is, like the other, three, R, S, and T, constructed of earthenware or burnt clay, and has at a short distance from the bottom a cock, and upon its top three tubes, each two inches high, the middle tube being one inch in diameter, and intended to receive a glass pipe. This vessel is eighteen inches high and twelve inches wide. The vessel R is two feet high and eight inches in diameter, and is placed in a water-tight wooden vessel from fourteen to fifteen inches in diameter and about sixteen inches high. Near the bottom of the said vessel R is a cock, and upon its top two short tubes, *r* and *r'*, each two inches long. The tube *r'*, being one and a quarter inch in diameter, furnishes a passage for a glass pipe, while the other tube, *r*, is two inches in diameter, and is intended for the reception of a lead pipe.

The two vessels S and T are each three feet high and two feet in diameter, and are provided with cocks *s* and *t* near their bottoms, and with three tubes two inches high and two inches in diameter passing through their tops.

The two sand-stone vessels N and P must be coated on the outside with a heated composition of one part pitch, three parts coal-tar, and one-eighth part plaster-of-paris, applied by means of a brush, and are ready for use when the mixture is well absorbed and dried. As a cement for tightening the pipes, a tenacious mixture of powdered clay, with flaxseed oil and a little plaster-of paris may be used.

In putting together the apparatus, the vessel N is connected with the vessel O by a lead pipe, *n*, bent in the form of a siphon, and reaching almost to the bottom of the vessel O, in which water is placed to the depth of about two inches. In the middle tube of vessel O is placed a glass pipe, *n'*, (called a "safety-pipe,") which is two and a half feet long, and reaches nearly to the bottom of said vessel. A siphon-shaped lead pipe, *o*, connects vessels O and P, reaching within about three inches of the bottom of the latter vessel, which is in turn connected with vessel R by a glass pipe, *p*, also siphon-shaped, reaching to within from two to one and a quarter inch of the bottom of the latter vessel. The wooden vessel, in which vessel R is placed, is so constructed as that cold water may flow in and out or it may hold ice for the purpose of cooling.

By means of lead pipes *s'* and *t'* the vessel R is connected with vessel S, and this in turn with vessel T.

Having thus fully set forth the nature and merits of this invention, what is claimed as new is—

1. The within-described apparatus for the production of sulphate of magnesia (or Epsom salts) from bittern-water of the salines, consisting of the pan A, vats B and E, filtering-tubs D D, &c., vat F, box G, pan H, and vessels I I, &c., all constructed and arranged substantially as and for the purpose herein set forth.

2. The edulcorating or filtering tubs D D, &c., constructed substantially as herein described, and for the purpose set forth.

3. The retort L, when constructed substantially as and for the purpose specified.

4. The apparatus used for the production of bromine, consisting of the stone vessels N and P, and the earthenware or burnt-clay vessels O, R, S, and T, together with their communicating siphon-shaped pipes *n*, *o*, *p*, *s'*, and *t'*, all constructed and arranged to operate substantially as and for the purpose shown.

6. The vessels N and P, constructed of sand-stone, granite, porphyry, or their equivalent, substantially as and for the purpose herein shown and described.

6. The application of steam to and within the vessels N and P, or their equivalent, substantially as and for the purpose herein shown.

7. The use of sand-stone, granite, or porphyry, or other equivalent, in the construction of vessels for use in the production of bromine.

In testimony whereof I have on this 8th day of May, 1869, hereto affixed my name in the presence of two witnesses.

AMALIE STIEREN.

Witnesses:
W. A. NISBET,
J. G. D. FINDLEY.